(12) United States Patent
Cheung et al.

(10) Patent No.: US 10,494,551 B2
(45) Date of Patent: Dec. 3, 2019

(54) ADHESIVE COMPOSTIONS WITH WIDE SERVICE TEMPERATURE WINDOW AND USE THEREOF

(71) Applicant: HENKEL IP & HOLDING GMBH, Duesseldorf (DE)

(72) Inventors: Chuiwah Alice Cheung, Hillsborough, NJ (US); Stephane Belmudes, Bernardsville, NJ (US)

(73) Assignee: HENKEL IP & HOLDING GMBH, Duesseldorf (DE)

(*) Notice: Subject to any disclaimer, the term of this patent is extended or adjusted under 35 U.S.C. 154(b) by 56 days.

(21) Appl. No.: 13/795,228

(22) Filed: Mar. 12, 2013

(65) Prior Publication Data
US 2014/0272219 A1 Sep. 18, 2014

(51) Int. Cl.
C09J 131/04 (2006.01)
C09J 123/08 (2006.01)
C08L 51/06 (2006.01)

(52) U.S. Cl.
CPC ......... *C09J 123/0853* (2013.01); *C08L 51/06* (2013.01); *Y10T 428/1334* (2015.01); *Y10T 428/2822* (2015.01)

(58) Field of Classification Search
CPC .. C09J 123/14; C09J 135/00; C09J 123/0853; C09J 2309/00; C09J 123/04; C09J 123/0815; C08F 210/02; C08L 23/08; C08L 23/0807; C08L 23/0853; C08L 23/0861; C08L 23/0869; C08L 23/0876; C08L 23/16; C08J 2309/00
USPC ............ 428/355 R, 355 AK, 355 AC, 317.7; 525/74, 78, 191, 222
See application file for complete search history.

(56) References Cited

U.S. PATENT DOCUMENTS

| | | | |
|---|---|---|---|
| 4,233,432 A | | 11/1980 | Curtis, Jr. |
| 4,284,541 A | * | 8/1981 | Takeda et al. ............... 524/272 |
| 4,299,745 A | * | 11/1981 | Godfrey ................ B32B 27/04 524/488 |
| 5,171,628 A | | 12/1992 | Arvedson et al. |
| 5,256,717 A | | 10/1993 | Stauffer et al. |
| 5,331,033 A | | 7/1994 | Stauffer et al. |
| 5,397,843 A | | 3/1995 | Lakshmanan et al. |
| 5,512,625 A | | 4/1996 | Butterbach et al. |
| 5,834,538 A | | 11/1998 | deHullu et al. |
| 6,026,957 A | * | 2/2000 | Bauer et al. ................. 206/494 |
| 6,143,818 A | * | 11/2000 | Wang et al. .................. 524/528 |
| 6,833,404 B2 | | 12/2004 | Quinn et al. |
| 7,208,541 B2 | | 4/2007 | Gong et al. |
| 7,378,481 B1 | * | 5/2008 | Gong et al. .................. 526/352 |
| 7,439,305 B2 | | 10/2008 | Hoffmann et al. |
| 2002/0013431 A1 | | 1/2002 | Bennett |
| 2005/0042469 A1 | * | 2/2005 | Gong et al. ................... 428/523 |
| 2005/0075431 A1 | | 4/2005 | Haner et al. |
| 2007/0155904 A1 | * | 7/2007 | Chou ........................... 525/207 |
| 2009/0203847 A1 | * | 8/2009 | Ellis ........................ C08L 23/04 525/221 |
| 2010/0059178 A1 | * | 3/2010 | Jiang et al. ................... 156/311 |
| 2010/0132886 A1 | * | 6/2010 | Rodriguez ............. C09J 123/14 156/334 |
| 2010/0160497 A1 | * | 6/2010 | Karjala et al. ................. 524/13 |
| 2011/0021103 A1 | | 1/2011 | Alper et al. |
| 2015/0037579 A1 | * | 2/2015 | Juers ................... B32B 37/1207 428/355 EN |

FOREIGN PATENT DOCUMENTS

| | | |
|---|---|---|
| JP | 60-51768 A | 3/1985 |
| JP | 8-325539 A | 12/1996 |
| JP | 2001-172590 A | 6/2001 |
| RU | 2208030 C2 | 7/2003 |
| SU | 55514 A1 | 4/1977 |
| WO | 0200045 A1 | 1/2002 |
| WO | 2012092233 A2 | 7/2012 |

OTHER PUBLICATIONS

Advancing Adhesive: Sticking to Innovation, Adhesive and Sealant Industry available online at https://www.adhesivesmag.com/articles/91310-advancing-adhesives-sticking-to-innovation on Sep. 4, 2012.*
AffinityTM GA Polyolefin Elastomers published online by Dow Chemical Co. at http://msdssearch.dow.com/PublishedLiteratureDOWCOM/dh_08c1/0901b803808c12f7.pdf?filepath=elastomers/pdfs/noreg/258-11901.pdf&fromPage=GetDoc on Dec. 2012.*
The Technical Data Sheet for Eastman G-3015 Polymer from Eastman available online at http://ws.eastman.com/ProductCatalogApps/PageControllers/ProdDatasheet_PC.aspx?product=71015384 on Mar. 12, 2018.*
Lee, S.M., Dictionary of Composite Materials Technology (Technomic Publishing Company, Inc., 1989) p. 43.
Young, R.J. & Lovell, P.A., Introduction to Polymers (2nd ed., Chapman & Hall, New York 1991), pp. 10-11, 292.
Handbook of Adhesives (ed. Irving Skeist, Van Nostrand Reinhold Co. 1977), pp. 495-498.
Kraus et al., Tack and Viscoelasticity of Block Copolymer Based Adhesives, J. Adhesion 10:221-36 (1979).
Eastman Chemical Brochure titled "World of Eastman Chemicals" dated Jan. 1989, Publication No. P-160F.
Eastman AQ Branched Polyesters Brochure dated Sep. 1997, Publication No. WA-62B.

(Continued)

*Primary Examiner* — Lee E Sanderson
(74) *Attorney, Agent, or Firm* — Sun Hee Lehmann

(57) ABSTRACT

The invention provides a hot melt adhesive comprising a polymer mixture of an ethylene vinyl acetate polymer with low vinyl acetate content and a functionalized metallocene catalyzed polyethylene copolymer. The hot melt adhesive has wide service temperature ranges for bonding cellulosic substrates together. The adhesive is well suited for case, tray, carton and bag sealing applications.

12 Claims, No Drawings

(56) References Cited

OTHER PUBLICATIONS

Eastman Chemical Sales Brochure dated Feb. 1993, Publication No. WA-21.
Exxon Chemical Sales Brochure dated Mar. 1994.
Eastman Chemical Eastotac Hydrocarbon Resins dated Nov. 1994, Publication WA-3C.
Exxon Chemical Escorez Tackifiers Brochure dated Apr. 1992.

* cited by examiner

ADHESIVE COMPOSTIONS WITH WIDE SERVICE TEMPERATURE WINDOW AND USE THEREOF

FIELD OF THE INVENTION

The present invention relates to hot melt adhesives with wide service temperature window, making these adhesives particularly well suited for case, tray, bag and carton sealing applications.

BACKGROUND OF THE INVENTION

Hot melt adhesives are applied to a substrate while in a molten state and cooled to harden the adhesive layer. The hot melt adhesives are commonly used to seal packages such as cardboard cases, trays and cartons. Depending on the environmental and transportation conditions, some packages require the hot melt adhesive to have high heat resistance and low cold temperature performance. Typically, conventional hot melt adhesive exhibit strong bonds at either high or low temperature, but not at both ends of the temperature spectra. Thus, depending on the desired needs of the packages or the environmental conditions, different or multiple adhesives must be used, leading to longer down-times in the manufacturing process.

Ethylene vinyl acetate (EVA) with high vinyl acetate content is used widely in the hot melt adhesives for case and carton sealing for a number of reasons. The high vinyl acetate content of the polymer forms strong adhesion to polar cellulosic substrates; however, the high vinyl acetate content EVA polymers are costly and lead to poor adhesion at either low or high temperature spectra.

Low temperature adhesion may be improved for hot melt adhesives by utilizing low glass transition temperature polymers and/or low melting point waxes and tackifiers. This improvement occurs at the expense of high temperature performance of the adhesive.

There is a need in the art for hot melt adhesives that extends the service temperature windows at both ends of the spectra. The current invention fulfills this need.

BRIEF SUMMARY OF THE INVENTION

The present invention relates to a hot melt adhesives that provides wide service temperature window and to articles of manufacture comprising the same adhesive.

One aspect of the invention is directed to a hot melt adhesive comprising (1) an ethylene vinyl acetate polymer having a vinyl acetate content less than about 25 wt %; (2) a functionalized ethylene-alpha-olefin copolymer; (3) a wax; and (4) a tackifier. The adhesive has an improved low temperature flexibility and high heat resistance.

In another embodiment, the invention is directed to a hot melt adhesive comprising (1) an ethylene vinyl acetate polymer having a vinyl acetate content less than about 20 wt %; (2) a functionalized ethylene-alpha-olefin copolymer; (3) a wax; and (4) a tackifier.

Yet another embodiment is directed to an article comprising a cellulosic substrate and a hot melt adhesive comprising (1) an ethylene vinyl acetate polymer having vinyl acetate content less than about 25%; (2) a functionalized ethylene-alpha-olefin copolymer; (3) a wax; and (4) a tackifier. The article of manufacture is a carton, case, tray or bag used for packaging products. The article may comprise cardboard, paperboard or other substrate that has been adhered by such hot melt adhesives. In another embodiment, the adhesive is pre-applied to the article, e.g., carton, case, tray or bag during the manufacture thereof, and prior to packaging of a product.

DETAILED DESCRIPTION OF THE INVENTION

All documents cited herein are incorporated in their entirety by reference.

Weight percent (wt %) are calculated based on the total weight of the adhesive, unless otherwise noted.

The use of a hot melt adhesives that has high heat resistance and good cold resistance is desirable for packages such as case, carton, bag or trays that are transported and/or stored under extreme temperatures.

It has been discovered that hot melt adhesives having an excellent balance of high and low temperature performance can be obtained using a polymer combination of ethylene vinyl acetate (EVA) polymer with low vinyl acetate content and a functionalized metallocene catalyzed copolymer.

The hot melt adhesive composition comprises at least one ethylene vinyl acetate copolymer (an EVA copolymer). The relative amount of the vinyl acetate present can be viewed as establishing how and to what degree the resulting ethylene copolymer is to be viewed as a polar polymeric constituent in the blended composition.

The ethylene vinyl acetate copolymer can have varied amounts of vinyl acetate content, but preferably has a vinyl acetate unit content of from 6 to 30% by weight, more preferably below 25% by weight, and most preferably below 24%, 23%, 22%, 21% and 20% by weight. The ethylene vinyl acetate copolymer may optionally be modified by methods well known in the art (for example, grafting), including modification with an unsaturated carboxylic acid or its derivatives.

The adhesive of the invention comprises from about 10 to about 60 wt %, more preferably, from about 20 to about 50 wt % of an ethylene vinyl acetate polymer having a MI of at least about 400 grams/10 minutes, preferably a MI of 500 grams/10 minutes.

Suitable ethylene vinyl acetate copolymers include those available from E. I. du Pont de Nemours and Company (DuPont), Wilmington, Del. under the ELVAX® copolymers tradename. Other ethylene vinyl acetate copolymers are available from Exxon Chemical Co. under the tradename ESCORENE™ Ultra EVA copolymer resins and also from Millennium Petrochemicals, Rolling Meadows, Ill., under the tradename ULTRATHENE® EVA copolymer and AT copolymers available from AT Polymers & Film Co., Charlotte, N.C. and EVATANE® resin from Atofina Chemicals, Philadelphia, Pa.

Mixtures of ethylene vinyl acetate copolymers may also be used as long as the resultant mixture falls within the described ranges of percent vinyl acetate by weight, and melt index. It is therefore possible to mix two ethylene vinyl acetates having different melt indices and different percentages of vinyl acetate.

Functionalized ethylene-alpha-olefin copolymer comprises an ethylene with a comonomer selected from C3 (propylene), C4 (butylene), C5 (pentene), C6 (hexane), C7 (heptene), C8 (octene), C9 (nonene), C10 (decene), C11 (undecene) or C12 (dodene) monomer.

A functional group is grafted onto a metallocene polyethylene copolymer to form a functionalized metallocene catalyzed polyethylene copolymer. This process may be performed by mixing metallocene catalyzed polyethylene copolymer with a functionalizing component in a reactor or in an extruder. A skilled artisan understands, that various functional group may be reacted or grafted onto the backbone of the copolymer with metallocene catalyzed polyethylene copolymer to result in a functionalized metallocene catalyzed polyethylene copolymer. Functional groups that can be used in the practice of the invention include, for example, acrylic acid, acetate, sulfonate, maleic anhydride, fumaric acid and citraconic anhydride. Useful functionalized metallocene catalyzed polyethylene copolymer for the adhesives include, acrylic acid functionalized metallocene catalyzed polyethylene copolymer, acetate functionalized metallocene catalyzed polyethylene copolymer, sulfonate functionalized metallocene catalyzed polyethylene copolymer, maleic anhydride functionalized metallocene catalyzed polyethylene copolymer, and the like. In one embodiment the functionalized metallocene catalyzed polyethylene copolymer is a maleic anhydride modified metallocene catalyzed polyethylene copolymer. In another embodiment the functionalized metallocene catalyzed polyethylene copolymer is a fumaric acid modified metallocene catalyzed polyethylene copolymer. In a further embodiment the functionalized metallocene catalyzed polyethylene copolymer is a citraconic anhydride modified metallocene catalyzed polyethylene copolymer.

The functional groups in the functionalized metallocene catalyzed ethylene copolymer are typically distributed randomly throughout the copolymer. Particularly preferred embodiments of the adhesive of the invention will comprise a functionalized metallocene catalyzed polyethylene copolymer comprising from about 0.1 to about 8 wt %, particularly about 0.3 to about 5 wt %, more particularly about 0.5 to about 3 wt % of the functional group, based on the weight of the metallocene polyethylene catalyzed copolymer.

Functionalized metallocene catalyzed polyethylene copolymer suitable for the invention will have molecular weights greater than 2,000 Daltons. The functionalized metallocene catalyzed polyethylene copolymer is different than a functionalized modified wax. A skilled artisan understands that functionalized modified wax typically has molecular weight less than 2,000 Daltons, whereas the copolymers have a molecular weight greater than 2,000 Daltons. The crystallinity of the functionalized ethylene copolymer ranges from 10 to 30%. The viscosity of the functionalized metallocene catalyzed polyethylene copolymer range from 10,000 cP to 20,000 cP at 350° F. Suitable functionalized metallocene catalyzed polyethylenes have a melt index ranging from about 200 to about 2,000 g/10 min, 190° C., 2.16 kg, preferably from about 500 to about 1750, measured in accordance with ASTM D1238. One exemplary functionalized metallocene catalyzed polyethylene is AFFINITY™ GA 1000R polyolefin plastomer from DOW®.

The functionalized metallocene polyethylene copolymer will typically be used in amounts of from about 0.5 wt % to 20 wt %, more preferably from about 1 wt % to about 15 wt %, and most preferably from about 2 to about 10 wt % of the adhesive. The use of more than 20 wt % may lead to phase separations and incompatibility with the other components of the adhesive.

The adhesive compositions of this invention are preferably tackified. The tackifier component will usually be present in an amount of from about 20 wt % to about 60 wt %, more preferably from about 20 wt % to about 50 wt %, even more preferably from about 20 wt % to about 45 wt %, based on the total weight of the adhesive. The tackifying resins typically will have Ring and Ball softening points, as determined by ASTM method E28, of between about 70° C. and 150° C., more typically between about 80° C. and 110° C., and even lower than 100° C., 99° C., 98° C., 97° C., 96° C., and 95° C. Mixtures of two or more tackifying resins may be desirable for some formulations.

In some embodiments, the tackifiers are synthetic hydrocarbon resins. Included synthetic hydrocarbon resins are aliphatic or cycloaliphatic hydrocarbons, aromatic hydrocarbons, aromatically modified aliphatic or cycloaliphatic hydrocarbons and mixtures thereof. Also included are hydrogenated versions of the above mentioned synthetic hydrocarbon resins.

Non-limiting examples include aliphatic olefin derived resins such as those available from Cray Valley under the trade name Wingtack™ Extra hydrocarbon resins and the Escorez™ 2203L tackifying resin series from Exxon. A common C5 hydrocarbon derived tackifier resin in this class is a diene-olefin copolymer of piperylene and 2-methyl-2-butene having a softening point of above 80° C. This resin is available commercially under the trade name Wingtack 95.

Also useful are C9 aromatic modified C5 hydrocarbon derived tackifiers. Such tackifiers are available from Sartomer and Cray Valley under the trade name Norsolene and from Rutgers series of TK aromatic hydrocarbon resins. Norsolene M1090 is a low molecular weight thermoplastic hydrocarbon polymer having a Ring and Ball softening point of 95-110° C. and is commercially available from Cray Valley.

Other useful tackifying resins include any compatible resin or mixtures thereof such as natural and modified rosins including, for example, gum rosin, wood rosin, tall oil rosin, distilled rosin, hydrogenated rosin, dimerized rosin, resinates, and polymerized rosin; glycerol and pentaerythritol esters of natural and modified rosins, including, for example, the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 70° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Also included are the cyclic or acyclic C[5] resins and aromatic modified acyclic or cyclic resins. Examples of commercially available rosins and rosin derivatives that could be used to practice the invention include SYLVALITE RE-110 resin, SYLVARES RE 115 resin, SYLVARES RE 104 resin and SYLVARES ZT 106 resin available from Arizona Chemical; Dertocal 140 from DRT; Limed Rosin No. 1, GB-120, and Pencel C from Arakawa Chemical. Examples of commercially available phenolic/aromatic modified terpene resins are Sylvares TP 2040 HM resin, Sylvares ZT-106 resin, and Sylvares TP 300 resin, available from Arizona Chemical.

Waxes suitable for use in the present invention include microcrystalline waxes, paraffin waxes, polyethylene waxes, polypropylene waxes, by-product polyethylene waxes, and Fischer-Tropsch waxes. High density low molecular weight polyethylene waxes, by-product polyethylene waxes and Fischer-Tropsch waxes are conventionally referred to in the art as synthetic high melting point waxes. CALLISTA® 122, 158, 144, 435, and 152 waxes available from Shell Lubricants, Houston, Tex.; PARAFLINT® C-80 and PARAFLINT® H-1, H-4 and H-8, Fischer-Tropsch waxes available from Sasol-SA/Moore&Munger, Shelton, Conn. are also preferred waxes for use in the practice of the invention.

Paraffin waxes that can be used in the practice of the invention include PACEMAKER® 30, 32, 35, 37, 40, 42, 45 and 53 waxes available from Citgo Petroleum, Co., Houston, Tex.; OKERIN® 236 TP wax available from Astor Wax Corporation, Doraville, Ga.; PENRECO® 4913 wax available from Pennzoil Products Co., Houston, Tex.; R-7152 Paraffin Wax available from Moore & Munger, Shelton, Conn.; and Paraffin Wax 1297 available from International Waxes, Ltd. in Ontario, Canada; R-2540 available from Moore and Munger; and other paraffinic waxes such as those available from CP Hall under the product designations 1230, 1236, 1240, 1245, 1246, 1255, 1260, & 1262, available from CP Hall (Stow, Ohio).

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include VICTORY® amber wax, a 70° C. melting point wax available from Petrolite Corp. located in Tulsa, Okla.; BARECO® ES-796 amber wax, a 70° C. melt point wax available from Bareco in Chicago, Ill.; OKERIN® 177, an 80° C. melt point wax available from Astor Wax Corp.; BESQUARE® 175 and 195 amber wax and 80° C. and 90° C. melt point microcrystalline waxes both available from Petrolite Corp. in Tulsa, Okla.; INDRAMIC® 91 wax, a 90° C. melt point wax available from Industrial Raw Materials located in Smethport, Pa.; and PETROWAX® 9508 Light wax, a 90° C. melt point wax available from Petrowax Pa., Inc. located in New York, N.Y.

Exemplary high density low molecular weight polyethylene waxes falling within this category include ethylene homopolymers available from Petrolite, Inc. (Tulsa, Okla.) as Polywax 500 wax, Polywax™ 1500 wax and Polywax™ 2000 wax. Polywax™ 2000 wax has a molecular weight of approximately 2000, an Mw/Mn of approximately 1.0, a density at 16° C. of about 0.97 g/cm$^3$ and a melting point of approximately 126° C.

Wax will typically be present in the formulations of the adhesive in amounts of 10 wt % to about 60 wt %, and most preferably greater than about 15 wt % to about 50 wt %, based on the total weight of the adhesive.

Preferred waxes have a melt temperature between 120° F. and 250° F., more preferably between 150° F. and 230° F., and most preferable between 180° F. and 220° F. The melting temperature of the wax can be measured by various means known in the art, but melting temperature values as reported herein are determined by a DSC: the wax was heated at a rate of 10° C./min to about 20° C. above its melting temperature and held isotherm for at about 3 minutes, then quench to −50° C. at a rate of 100° C./min and then heated again at a rate of 10° C./min, and the highest peak of the second heating curve of the DSC was deemed as the DSC melting temperature.

It will be appreciated that other polymeric additives may, if desired, be added to the adhesive formulation. The adhesives of the present invention may also contain a stabilizer or antioxidant. These compounds are added to protect the adhesive from degradation caused by reaction with oxygen induced by such things as heat, light, or residual catalyst from the raw materials such as the tackifying resin. Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3, 5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis (2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

The performance of these antioxidants may be further enhanced by utilizing, in conjunction therewith, known synergists such as, for example, thiodipropionate esters and phosphites. Distearylthiodipropionate is particularly useful. These stabilizers, if used, are generally present in amounts of about 0.1 to 1.5 wt %, preferably 0.25 to 1.0 wt %.

Such antioxidants are commercially available from BASF and include IRGANOX® 565, 1010 and 1076 antioxidants which are hindered phenols. These are primary antioxidants which act as radical scavengers and may be used alone or in combination with other antioxidants such as phosphite antioxidants like IRGAFOS® 168 antioxidant available from BASF. Phosphite catalysts are considered secondary catalysts and are not generally used alone. These are primarily used as peroxide decomposers. Other available catalysts are CYANOX® LTDP antioxidant available from Cytec Industries in Stamford, Conn., and ETHANOX® 1330 antioxidant available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art. Depending on the contemplated end uses of the adhesives, other additives such as plasticizers, pigments, dyestuffs and fillers conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10% by weight, into the formulations of the present invention.

The adhesive compositions of the present invention are prepared by blending the components in the melt at a temperature of above about 275° F., typically at about 300° F. until a homogeneous blend is obtained. Various methods of blending are known in the art and any method that produces a homogeneous blend is satisfactory. For example, a Cowles stirrer provides effective mixing for preparing these compositions.

The adhesive compositions of the present invention typically have a viscosity range of about 600 cP (centipoise) to about 1,500 cP at 350° F.

The hot melt adhesives of the present invention are particularly useful in case sealing applications where exceptionally high heat resistance in addition to cold resistance is important, i.e., in hot filled packaging applications; e.g. sealing and closing operations for cartons, cases, or trays used in packaging molten cheese, ice creams, yogurt or freshly baked goods which are subsequently subjected to refrigeration or freezing, and for corrugated cases, which are often subjected to high stresses and adverse environmental conditions during shipping and storage.

EVA based hot melt adhesives bond well to polar substrates, e.g., cellulosic substrates, and thus they are widely used, but they do not perform well at the two ends of the temperature spectra. The high temperature performance of the EVA based adhesive can be improved at the expense of the low temperature performance by utilizing high softening point tackifiers and high melting point waxes. Conversely, the low temperature performance of the EVA based adhesives can be improved at the expense of the high temperature performance by utilizing low softening point tackifiers and low melting point waxes. Also, the use of low glass transition temperature (Tg) polymers, such as ethylene-alpha-olefin copolymers, in the hot melt adhesive results in better low temperature performance; however, the low polarity of the polymer results in poor adhesion of the adhesive. While a combination of the two polymer, EVA and ethylene-alpha-olefin copolymer, may present better performances at both ends of the temperature spectra, they are not miscible and therefore, result in antagonistic adhesive properties. Thus, it is surprising that the addition of a functionalized low Tg metallocene polyethylene, even with less than 10% of a functional group grafted onto the polyethylene copolymer, compatiblizes with EVA polymer by forming a clear adhesive in the molten state, and synergistically, they provide a low temperature flexibility for the adhesive while increasing the high temperature performance. The hot melt adhesive with a mixture of EVA and functionalized metallocene polyethylene offers versatility for packaging application because it can streamline the manufacturing process to fewer types of adhesives while providing the performance requirement of extreme service temperature ranges.

The hot melt adhesives of the invention find use in packaging, converting, cigarette manufacture, bookbinding, bag ending and in nonwoven markets. The adhesives find particular use as case, carton, and tray forming adhesives, and as sealing adhesives, including heat sealing applications, for example in the packaging of cereals, cracker and beer products. Encompassed by the invention are containers, e.g., cartons, cases, boxes, bags, trays and the like, wherein the adhesive is applied by the manufacturer thereof prior to shipment to the packager. Following packaging, the container is heat sealed. The adhesive is also particularly useful in the manufacture of nonwoven articles. The adhesives may also be used as construction adhesives, as positioning adhesives, and in elastic attachment applications in the manufacture of, e.g., diapers, feminine hygiene pads (which include conventional sanitary napkins and panty liners) and the like.

The substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil which is further laminated to film materials such as polyethylene, mylar, polypropylene, polyvinylidene chloride, ethylene vinyl acetate and various other types of films. Additionally, these film materials also may be bonded directly to chipboard or kraft. The aforementioned substrates by no means represent an exhaustive list, as a tremendous variety of substrates, especially composite materials; find utility in the packaging industry.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

EXAMPLES

The following examples are provided for illustrative purposes only. All parts in the formulation are by weight.

TABLE 1

| Polymers for Adhesives | Sample C1 | Sample C2 | Sample C3 | Sample A |
|---|---|---|---|---|
| EVA, vinyl acetate 19%, MI = 500 | 35 | 25 | | 25 |
| EVA, vinyl acetate 33%, MI = 400 | | | | |
| Ethylene alpha olefin copolymer | | 10 | 35 | |
| Maleic anhydride grafted ethylene alpha olefin copolymer | | | | 10 |

Comparative Sample C1 is an adhesive based on low vinyl acetate ethylene content (19%) EVA polymer; Comparative Sample C2 is a mixture of low vinyl acetate content EVA polymer and a low Tg ethylene-alpha-olefins copolymer; and Comparative Sample C3 is an adhesive based on high vinyl acetate ethylene content (33%) EVA polymer. Sample A adhesive is a mixture of low vinyl acetate content EVA polymer and a maleic anhydride grafted ethylene-alpha-olefins copolymer. The samples were formed by combining the components listed in Table 1 and 25 wt % of Fischer-Troupe wax (melting point of 105° C.) and 40 wt % of hydrocarbon resin (softening point of 100° C.) in a metal vessel and mixing with a stainless steel mixing blade at 350° F. until homogeneous mixtures were formed The adhesives were then applied with a compressed bead width of/2" between two kraft paper substrates at the designated application temperatures (Table 2). The heat stress and adhesion properties were measured from the samples and the results are summarized in Table 2.

Heat stress is defined as the temperature at which a stressed bond fails. Heat stress test was conducted by forming a composite construction of adhesive (½' compressed) between two pieces of corrugated paperboard of specific dimensions. At least three test samples were prepared. The test samples were conditioned at room temperature for 24 hours. The adhesive bead forming this composite was then placed under approximately 100 grams of cantilever stress for 24 hours at specific temperatures. The highest temperature at which the adhesive passed the heat stress was recorded Adhesion (fiber tear) was determined as follows. A ½" wide bead of adhesive was applied at specified application temperature to a 2"×3" piece of double fluted corrugate board, and was immediately brought in contact with a second piece of corrugated to form a bond. A 200 gram weight was immediately placed on the top of the bond for 10 seconds to provide compression. The specimens prepared were conditioned at room temperature for 24 hours and further conditioned at specified temperatures for 24 hours. The bonds were separated by hand and the resulting fiber tear was recorded (higher values indicated better adhesion). Fiber tear was calculated as the amount of fiber left on the surface of the adhesive, which indicates failure within the substrate and not at the interface between the adhesive and the substrate. Three specimens were tested to obtain the average percent fiber tear.

TABLE 2

|  | Sample C1 | Sample C2 | Sample C3 | Sample A |
|---|---|---|---|---|
| Heat Stress (24 hours) | | | | |
| 130° F. (54° C.) | N/A | N/A | Fail | N/A |
| 135° F. (57° C.) | Pass | Pass | Fail | Pass |
| 140° F. (60° C.) | Pass | Fail | N/A | Pass |
| 145° F. (63° C.) | Pass | N/A | N/A | Pass |
| Adhesion (average fiber tear %) | | | | |
| 145° F. (63° C.) | 52 | N/A | N/A | 48 |
| 140° F. (60° C.) | 61 | 18 | N/A | 63 |
| 135° F. (57° C.) | 76 | 91 | 10 | 94 |
| 130° F. (54° C.) | N/A | N/A | 33 | N/A |
| 20° F. (−7° C.) | 38 | 65 | 84 | 94 |
| 0° F. (−18° C.) | 13 | 60 | 97 | 96 |
| −20° F. (−29° C.) | 18 | 58 | 99 | 90 |

As demonstrated in Table 2, an adhesive based on EVA polymer with low vinyl acetate content of 19% (Comparative Sample C1) had insufficient adhesion at low temperatures. The addition of ethylene-alpha-olefin copolymer to the low vinyl acetate content EVA polymer (Comparative Sample C2) had insufficient high temperature performances, but slight improvement in low temperature performances. The adhesive made with 33% vinyl acetate content EVA polymer (Comparative Sample C3) had insufficient adhesion at high temperatures. Only Sample A, low vinyl acetate content EVA polymer and functionalized ethylene-alpha-olefin copolymer, passed the heat stress tests at 145° F. and had high average fiber tear percentage at low temperatures.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A hot melt adhesive composition consisting of:
   (A) about 10 to about 60 wt % of an ethylene vinyl acetate polymer, wherein the vinyl acetate content is less than 25 wt %;
   (B) about 2 to about 10 wt % of a functionalized metallocene catalyzed polyethylene copolymer having a viscosity range of 10,000 to 20,000 cP at 350° F., wherein the functionalized metallocene catalyzed polyethylene copolymer is grafted with a functional group selected from fumaric acid, acrylic acid, acetate, sulfonate, citaconic anhydride or maleic anhydride;
   (C) a wax;
   (D) about 20 to about 60 wt % of a tackifier; and
   (E) a stabilizer, plasticizer, oil, antioxidant, crosslinking agent, filler, nucleating agent, adhesion promoter, elastomer, colorant, rheology modifier or mixtures thereof, wherein the total wt % of the components is equal to 100 wt % of the adhesive;
   wherein the adhesive has a clear, miscible state at the molten temperature; and
   wherein the adhesive is characterized as having higher low temperature flexibility and higher heat resistance over an adhesive without the functionalized metallocene catalyzed polyethylene copolymer.

2. The hot melt adhesive composition of claim 1, wherein the ethylene vinyl acetate polymer has a vinyl acetate content of less than about 22%.

3. The hot melt adhesive composition of claim 2, wherein the ethylene vinyl acetate polymer has a vinyl acetate content of less than about 20%.

4. The hot melt adhesive composition of claim 1, wherein the functionalized metallocene catalyzed polyethylene copolymer comprises a comonomer selected from C3, C4, C5, C6, C7, C8, C9, C10, C11, or C12 monomer.

5. The hot melt adhesive composition of claim 1, wherein the wax has a melting point of greater than about 80° C.

6. The hot melt adhesive composition of claim 5, wherein the wax has a melting point of greater than about 85° C.

7. The hot melt adhesive composition of claim 5, wherein the wax is selected from the group consisting of microcrystalline waxes, paraffin waxes, polyethylene waxes, polypropylene waxes, by-product polyethylene waxes, and Fischer-Tropsch waxes.

8. The hot melt adhesive composition of claim 1, wherein the tackifier has a ring and ball softening point of about 70° C. to about 150° C.

9. The hot melt adhesive composition of claim 1, wherein the tackifier is selected from the group consisting of aliphatic or cycloaliphatic hydrocarbons, aromatic hydrocarbons, aromatically modified aliphatic or cycloaliphatic hydrocarbons, rosin, rosin esters, and terpene esters.

10. An article comprising a cellulosic substrate and the adhesive of claim 1.

11. The article of claim 10 wherein the cellulosic substrate is a virgin kraft, recycled kraft, high and low density kraft, and/or chipboard.

12. The article of claim 10 which is a case, carton, tray, or bag.

* * * * *

UNITED STATES PATENT AND TRADEMARK OFFICE
CERTIFICATE OF CORRECTION

PATENT NO. : 10,494,551 B2
APPLICATION NO. : 13/795228
DATED : December 3, 2019
INVENTOR(S) : Chuiwah Alice Cheung and Stephane Belmudes It is certified that error appears in the above-identified patent and that said Letters Patent is hereby corrected as shown below:

In the Specification

Column 8, Line 55: Change "of/2"" to --of ½"--.

Column 8, Line 61: Change "½"" to --½"--.

Signed and Sealed this
Fourth Day of August, 2020

Andrei Iancu
*Director of the United States Patent and Trademark Office*